United States Patent [19]

Sigai et al.

[11] Patent Number: 4,748,391
[45] Date of Patent: May 31, 1988

[54] YELLOW GREEN BARIUM LANTHANUM SILICATE OXYAPATITE PHOSPHOR, A FLUORESCENT LAMP CONTAINING THE SAME, AND A METHOD THEREOF

[75] Inventors: A. Gary Sigai; Michael N. Alexander, both of Lexington, Mass.

[73] Assignee: GTE Laboratories Incorporated, Waltham, Mass.

[21] Appl. No.: 943,109

[22] Filed: Dec. 18, 1986

[51] Int. Cl.$^4$ .............................. C09K 11/477
[52] U.S. Cl. .............................. 313/486; 252/301.4 F
[58] Field of Search .................. 252/301.4 F; 313/486

[56] References Cited

U.S. PATENT DOCUMENTS

| | | | |
|---|---|---|---|
| 2,297,108 | 9/1942 | McKeag et al. | 252/301.4 F |
| 3,505,240 | 4/1970 | Barry | 252/301.4 F |
| 3,650,974 | 3/1972 | Ward | 252/301.4 F |
| 3,676,361 | 7/1972 | Datta | 252/301.4 F |
| 3,790,490 | 2/1974 | Datta et al. | 252/301.4 F |

OTHER PUBLICATIONS

Wanmaker et al., "J. of Solid State Chem.", 3, pp. 452–457, (1971).
Isaacs, "J. of Electrochem Soc.", vol. 120, No. 5, pp. 654–656, (1973).

Primary Examiner—Jack Cooper
Attorney, Agent, or Firm—Ivan L. Ericson

[57] ABSTRACT

A method for preparing a barium lanthanum silicate oxyapatite europium activated phosphor and a barium lanthanum silicate oxyapatite manganese 2+ and europium 2+ or europium 2+ activated phosphor having a yellow green emission when activated by 254 nm excitation comprises the steps of forming a water slurry of the raw materials followed by calcining at approximately 1050° C. to form a powder. The powder is then heated to approximately 1500° C. in a reducing atmosphere to form the phosphor having a yellow green emission activated by a 254 nm excitation. Fluorescent lamps containing the yellow green emitting phosphors are described.

18 Claims, 2 Drawing Sheets

YELLOW GREEN BARIUM LANTHANUM SILICATE OXYAPATITE PHOSPHOR, A FLUORESCENT LAMP CONTAINING THE SAME, AND A METHOD THEREOF

FIELD OF THE INVENTION

This invention relates to a method of making a silicate phosphor. More particularly, this invention relates to a method of making a barium lanthanum silicate oxyapatite phosphor.

BACKGROUND OF THE INVENTION

Phosphors of alkaline earth yttrium and lanthanum phosphates silicates with an apatite structure had been prepared by Wanmaker et al. and described in the Journal of Solid State Chemistry 3, 452-457 (1971) in which they described a double firing process at temperatures between 1200° and 1500° C. The first firing was for two hours at 1350° C., the reaction products being ground, sieved and refired for two hours at 1350° C. The samples were prepared in air, but for cerium and tin activation a slightly reducing atmosphere was used. In a paper by Isaacs entitled *A Study for Eu$^{3+}$ Fluorescence in Some Silicate Oxyapatites*, discusses the intense red luminescence seen when europium 3+ activated strontium yttrium silicate oxyapatite was excited with a 313 nm radiation.

Silicate apatites are hard, stable materials and lend themselves to a variety of compositional substitutions. The silicate oxyapatites prepared by Issacs were fired in air at approximately 1300° C. for a period of four hours. In addition to the europium activated strontium silicate oxyapatites, Isaacs studied the calcium and manganese analogs.

SUMMARY OF THE INVENTION

In accordance with one aspect of the present invention a new and improved method of making a yellow green emitting barium lanthanum silicate oxapatite activated by europium 2+ phosphor comprises the following steps:

Step 1—A homogeneous water slurry of europium oxide, lanthanum oxide, silicic acid, barium nitrate and a dispersing agent is formed.

Step 2—The product from step 1 is dried.

Step 3—The product from step 2 is calcined at about 1050° C. and cooled to form a calcined powder.

Step 4—The product from step 3 is heated in a reducing atmosphere at a temperature and for a time sufficient to form a phosphor having a yellow green emission color when activated by 254 nm excitation.

In accordance with another aspect of the present invention a new and improved method of making a yellow green emitting barium lanthanum silicate oxyapatite activated by manganese 2+ and europium 2+ phosphor comprises the following steps:

Step 1—A homogeneous water slurry or europium oxide, manganese carbonate, lanthanum oxide, silicic acid, barium nitrate and a dispersing agent is formed.

Step 2—The product from step 1 is dried.

Step 3—The product from step 2 is calcined at about 1050° C. and cooled to form a calcined powder.

Step 4—The product from step 3 is heated in a reducing atmosphere at a temperature and for a time sufficient to form a phosphor having a yellow green emission color when activated by 254 nm excitation.

In accordance with another aspect of the present invention a new and improved fluorescent lamp comprises a fluorescent lamp comprising a light-transmitting envelope having electrodes, an inert ionizable gas and a charge of mercury therein and a coating of a phosphor on the inside surface of the envelope. The phosphor comprises a yellow-green emitting barium lanthanum silicate oxyapatite activated by manganese 2+ and europium 2+ or a yellow green emitting barium lanthanum silicate oxyapatite activated by the europium 2+ made in accordance with the methods described above.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
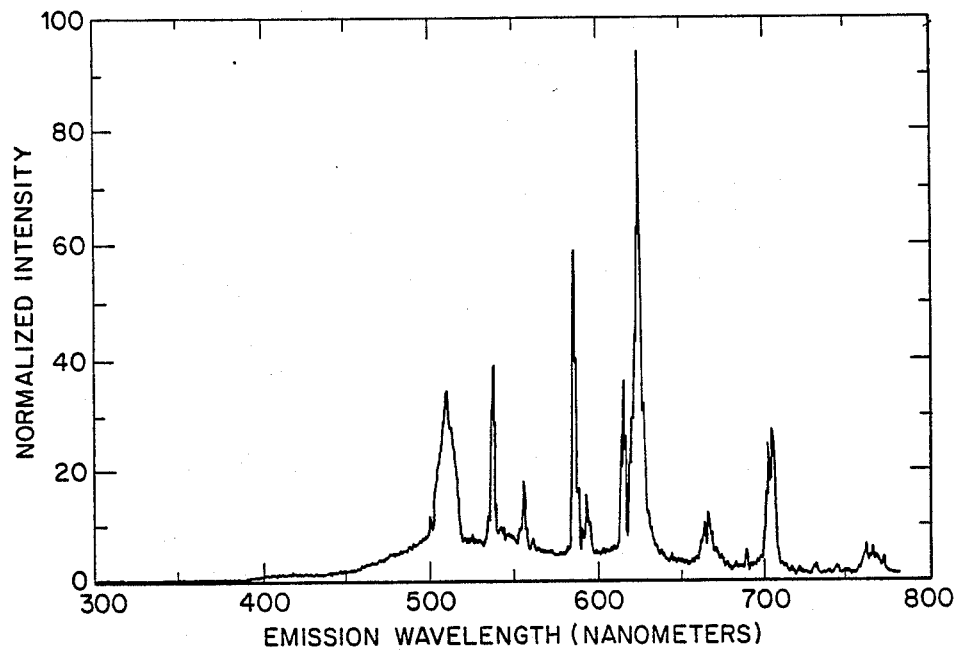
FIG. 1 is an emission spectra of a $Ba_2La_8(SiO_4)_6O_2$:Eu phosphor excited by 254 nm radiation in accordance with the present invention.

A new and improved barium lanthanum silicate oxyapatite phosphor activated by europium 2+ has a yellow green emission when excited by a 254 nm radiation as shown in FIG. 1. This phosphor was made by the following process: a homogeneous water slurry was prepared by mixing lanthanum oxide, europium oxide, barium nitrate, silicic acid and a dispersing agent such as Darvon C in water to form a slurry. The amount of the ingredients was based upon the molecular formulation $(Ba_{0.99}Eu_{0.01})_2La_8(SiO_4)_6O_2$. The slurry was then dried to form a powder. The powder was then calcined at approximately 1050° C. and cooled to room temperature to form a calcined powder. The calcined powder was then heated from room temperature up to approximately 1500° C. in one hour in a dry forming gas atmosphere at a gas flow rate of approximately 0.5 liters per min. and held at 1500° C. for approximately 3 hours then cooled to room temperature in one hour.

Figure 2:
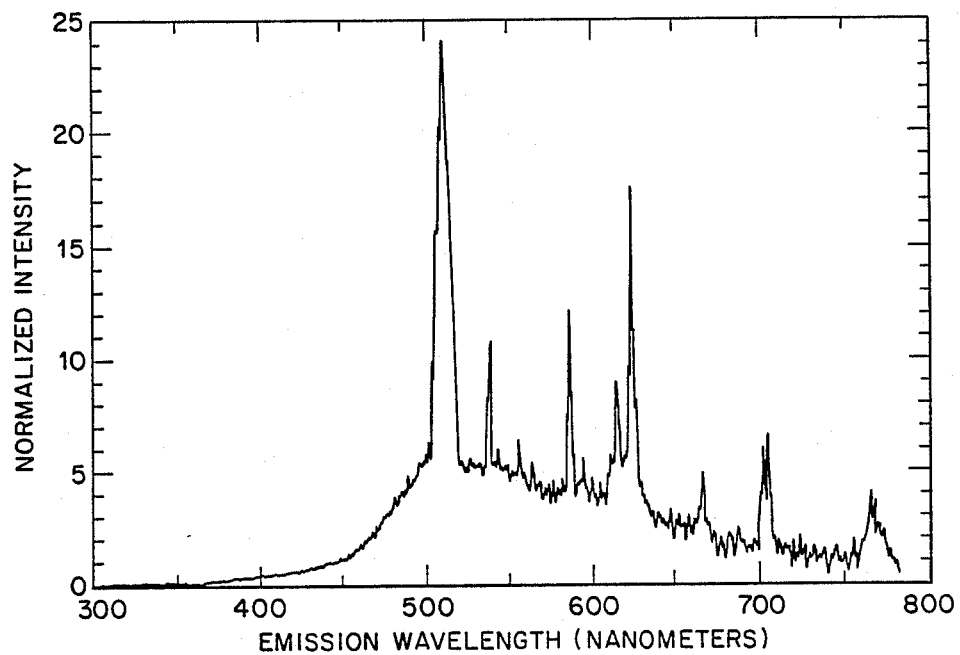
FIG. 2 is an emission spectra of a $Ba_2La_8(SiO_4)_6O_2$:Mn,Eu phosphor excited by 254 nm radiation in accordance with the present invention.

A new and improved barium lanthanum silicate oxyapatite phosphor activated by manganese 2+ and europium 2+ has a yellow green emission when excited by a 254 nm radiation as shown in FIG. 2. This phosphor was made by the same process as described above except that manganese oxide was included in the formulation and the ingredients were added based upon the formula $(Ba_{0.98}Eu_{0.01}Mn_{0.01})_2La_8(SiO_4)_6O_2$.

Table I lists the cation ICP (inductive coupled plasma) analysis of the barium lanthanum silicate oxyapatite phosphor activated by europium 2+ and the barium lanthanum silicate oxyapatite phosphor activated by europium 2+ and manganese 2+.

TABLE I

Cation ICP analysis of the barium lanthanum silicate oxyapatite phosphor activated by europium 2+ phosphor (A); and the barium lanthanum silicate oxyapatite phosphor activated by europium 2+ and manganese 2+ phosphor (B).

| Cation (w/o) | Phosphor (A) | Phosphor (B) |
|---|---|---|
| Ba | 13.4 | 11.9 |
| La | 61.3 | 61.9 |
| Si | 7.9 | 8.0 |
| Eu | 0.14 | 0.18 |
| Mn | — | 0.05 |

Figure 3:
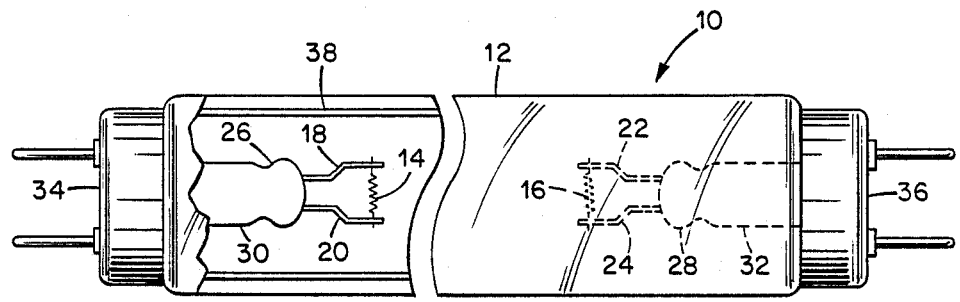
FIG. 3 is a view of a fluorescent lamp, partially in section, diagrammatically illustrating an embodiment of the present invention.

Referring now to FIG. 3 with greater particularity, there is shown in a fluorescent lamp 10. Lamp 10 comprises an elongated sealed glass envelope 12 of circular cross section. It has the usual electrodes 14 and 16 at each end supported by lead-in wires 18, 20 and 22, 24, respectively, which extend through glass presses 26, 28 in mount stems 30, 32 to the contacts in bases 34, 36 affixed to the ends of the lamp 10.

Envelope 12 is filled with an inert gas such as argon or a mixture of argon and neon at a low pressure, for example, two torr, and a small quantity of mercury, at least enough to provide a low vapor pressure of about six microns during operation.

The interior of envelope 12 is coated with a layer of phosphor 38, a yellow green emitting barium lanthanum silicate oxyapatite phosphor activated by manganese 2+ and europium 2+ or a yellow green emitting barium lanthanum silicate oxyapatite phosphor activated by europium 2+.

A phosphor coating suspension is prepared by dispersing the phosphor particles in a water base system employing polyethylene oxide as the binder with water as the solvent.

The phosphor suspension is applied in the usual manner of causing the suspension to flow down the inner surface of envelope 12 and allowing the water to evaporate, leaving the binder and phosphor particles adhered to the envelope 12 wall. The phosphor coated envelope 12 is then heated in a lehr oven to volatilize the organic components, the phosphor layer 38 remaining on the envelope 12 wall.

Envelope 12 is processed into a fluorescent lamp by conventional lamp manufacturing techniques.

While there has been shown and described what is at present considered to preferred embodiment of the invention, it will be obvious to those skilled in the art that various changes and modifications may be made therein without departing from the scope of the invention as defined by the appended claims.

What is claimed is:

1. A method of preparing a yellow green emitting barium lanthanum silicate oxyapatite phosphor activated by manganese +2 and europium +2 having a composition defined by the general formula: $Ba_2La_8(SiO_2)_6O_2$:Mn,Eu in which Mn and Eu are in the divalent state comprising the following steps:

Step 1—forming a water slurry of lanthanum oxide, europium oxide, manganese carbonate, silicic acid, barium nitrate, and a dispersing agent;

Step 2—drying the product from step 1 to form a powder;

Step 3—calcining the product of step 2 at about 1050° C. and cooling to form a calcined powder;

Step 4—heating the product from step 3 in a reducing atmosphere at a temperature and for a time sufficient to form a phosphor having a yellow green emission exhibiting characteristic wavelengths essentially as depicted in FIG. 2 when activated by 254 nm excitation.

2. A method in accordance with claim 1 wherein said barium nitrate, lanthanum oxide, silicic acid, manganese carbonate, europium oxide are added in an amount based on a molecular formulation $(Ba_{0.98}Eu_{0.01}Mn_{0.01})_2La_8(SiO_4)_6O_2$.

3. A method in accordance with claim 1 wherein said reducing atmosphere comprises a dry forming gas at a gas flow rate of approximately 0.5 liters per min.

4. A method in accordance with claim 1 wherein said step 4 comprises heating the product from step 3 to about 1500° C. in about one hour and holding at 1500° C. for about three hours then cooling to room temperature in about one hour.

5. A method in accordance with claim 1 wherein said phosphor comprises cations of about 11.9 wt.% barium, 0.18 wt.% europium, 0.05 wt.% manganese, 61.9 wt.% lanthanum, and 8.0 wt.% silica.

6. A fluorescent lamp comprising a light-transmitting envelope having electrodes, an inert ionizable gas and a charge of mercury therein and a coating of a phosphor on the inside surface of said envelope, said phosphor comprising a yellow green emitting barium lanthanum silicate oxyapatite activated by manganese 2+ and europium 2+ exhibiting characteristic wavelengths essentially as depicted in FIG. 2 and having a composition defined by the general formula: $Ba_2La_8(SiO_2)_6O_2$:Mn,Eu in which Mn and Eu are in the divalent state made in accordance with the method of claim 1.

7. A fluorescent lamp in accordance with claim 6 in which said phosphor comprises cations of about 11.9 wt.% barium, 0.18 wt.% europium, 0.05 wt.% manganese, 61.9 wt.% lanthanum, and 8.0 wt.% silica.

8. A method of preparing a yellow green emitting barium lanthanum silicate oxyapatite phosphor activated by europium 2+ having a composition defined by the general formula: $Ba_2La_8(SiO_2)_6O_2$:Eu in which Eu is in the divalent state comprising the following steps:

Step 1—forming a water slurry of lanthanum oxide, europium oxide, silicic acid, barium nitrate, and a dispersing agent;

Step 2—drying the product from step 1 to form a powder;

Step 3—calcining the product of step 2 at about 1050° C. and cooling to form a calcined powder;

Step 4—heating the product of step 3 in a reducing atmosphere at a temperature and for a time sufficient to form a phosphor having a yellow green emission exhibiting characteristic wavelengths essentially as depicted in FIG. 1 when activated by 254 nm radiation.

9. A method in accordance with claim 8 wherein said lanthanum oxide, europium oxide, silicic acid, and barium nitrate are added in an amount based on a molecular formulation $(Ba_{0.99}Eu_{0.01})_2La_8(SiO_4)_6O_2$.

10. A method in accordance with claim 8 wherein said reducing atmosphere comprises a dry forming gas at a gas flow rate of approximately 0.5 liters per min.

11. A method in accordance with claim 8 wherein said step 4 comprises heating the product from step 3 to about 1500° C. in about one hour and holding at 1500° C. for about three hours then cooling to room temperature in about one hour.

12. A method in accordance with claim 8 wherein said phosphor comprises cations of about 13.4 wt.% barium, 0.14 wt.% europium, 61.3 wt.% lanthanum, and 7.9 wt.% silica.

13. A fluorescent lamp comprising a light-transmitting envelope having electrodes, an inert ionizable gas and a charge of mercury therein and a coating of a phosphor on the inside surface of said envelope, said phosphor comprising a yellow green emitting barium lanthanum oxyapatite silicate activated by europium 2+ exhibiting characteristic wavelengths essentially as depicted in FIG. 1 and having a composition defined by the general formula: $Ba_2La_8(SiO_2)_6O_2$:Eu in which Eu is in the divalent state made in accordance with the method of claim 8.

14. A fluorescent lamp in accordance with claim 13 wherein said phosphor comprises cations of about 13.4 wt.% barium, 0.14 wt.% europium, 61.3 wt.% lanthanum, and 7.9 wt.% silica.

15. A yellow green emitting phosphor exhibiting characteristic emission wavelengths essentially as depicted in FIG. 1 when excited by 254 nm excitation, said phosphor having a composition defined by the general formula: $Ba_2La_8(SiO_2)_6O_2$:Eu in which Eu is in the divalent state.

16. A yellow green emitting phosphor in accordance with claim 15 wherein said general formula being $(Ba_{0.99}Eu_{0.01})_2La_8(SiO_4)_6O_2$.

17. A yellow green emitting phosphor exhibiting characteristic emission wavelengths essentially as depicted in FIG. 2 when excited by 254 nm excitation, said phosphor having a composition defined by the general formula: $Ba_2La_8(SiO_2)_6O_2$:Mn, Eu in which Mn and Eu are in the divalent state.

18. A yellow green emitting phosphor in accordance with claim 17 wherein said general formula being $(Ba_{0.98}Eu_{0.01}Mn_{0.01})_2La_8(SiO_4)_6O_2$.

* * * * *